May 17, 1949.   C. JOBST   2,470,402
INJECTION MOLDING MACHINE
Filed Oct. 4, 1945   4 Sheets-Sheet 1

Inventor
CONRAD JOBST
By Ruler & Hoge
Attorneys

May 17, 1949.   C. JOBST   2,470,402
INJECTION MOLDING MACHINE
Filed Oct. 4, 1945   4 Sheets-Sheet 4

Inventor
CONRAD JOBST
By Rule and Hoge.
Attorneys

Patented May 17, 1949

2,470,402

UNITED STATES PATENT OFFICE 2,470,402

INJECTION MOLDING MACHINE

Conrad Jobst, Toledo, Ohio, assignor, by mesne assignments, to Owens-Illinois Glass Company, Toledo, Ohio, a corporation of Ohio Application October 4, 1945, Serial No. 620,238

8 Claims. (Cl. 18—30)

My invention relates to injection molding machines for molding various articles under high pressure within the molds. The machine is adapted for use in molding articles consisting of organic thermoplastic materials or the like. These may be of thermo-setting type which set or harden while at a high temperature and under pressure. In molding articles from such materials, it is customary to inject the molding compound, while hot and in a fluid or plastic condition, into the molds under the high pressure needed to force the material through the injection nozzle and into the molds. In this operation, it is often found difficult or impossible to completely fill the mold cavities owing to the restricted outlet opening of the injection nozzle, the extended and more or less restricted sprue channels or passageways leading from the nozzle to the mold cavities and the shapes of the cavities themselves. An object of the present invention is to provide novel and efficient means for overcoming such difficulty and insuring a complete filling of the mold cavities and compacting of the molding material therein.

A further object of the invention is to provide, in combination with the nozzle, auxiliary means located at suitable positions adjacent to the mold cavities for completely filling the cavities from a local auxiliary supply of the molding material, after molding material has been forced through the injection nozzle into the molds and a predetermined pressure built up therein.

A further object of the invention is to provide, in combination with the nozzle, auxiliary injecting devices automatically controlled through electrically operated means responsive to back pressure of the molding material.

Other objects of my invention will appear hereinafter.

Referring to the accompanying drawings.

The machine as herein shown is of the type illustrated in my Patent No. 2,372,833, Injection molding machine, granted April 3, 1945, to which reference may be had for a detailed description of the general construction and operation of the machine.

Figure 1:
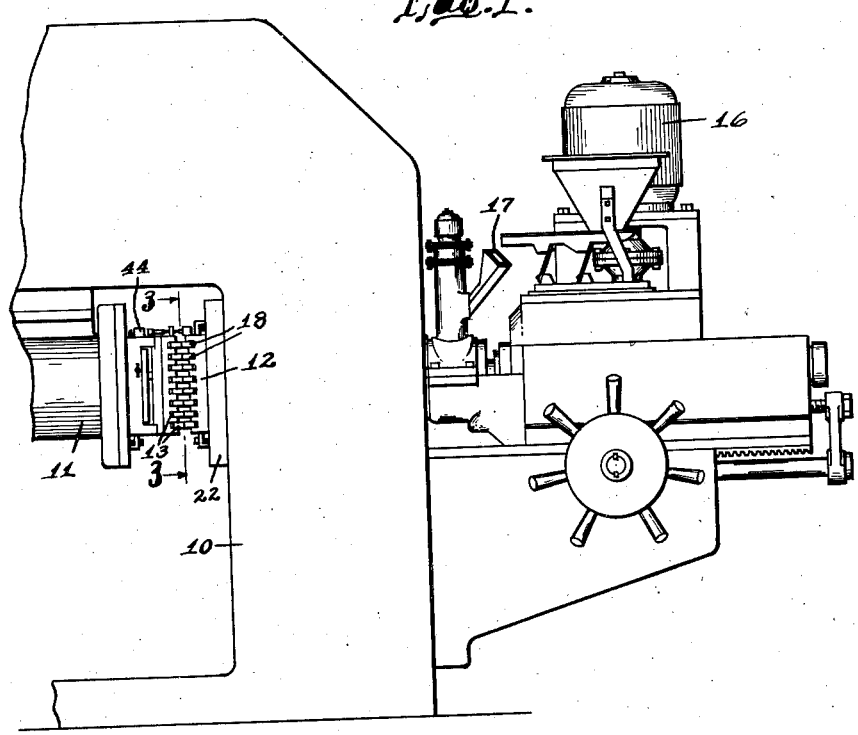
Fig. 1 is an elevational view, with parts broken away, of a machine embodying my invention.
Figure 5:
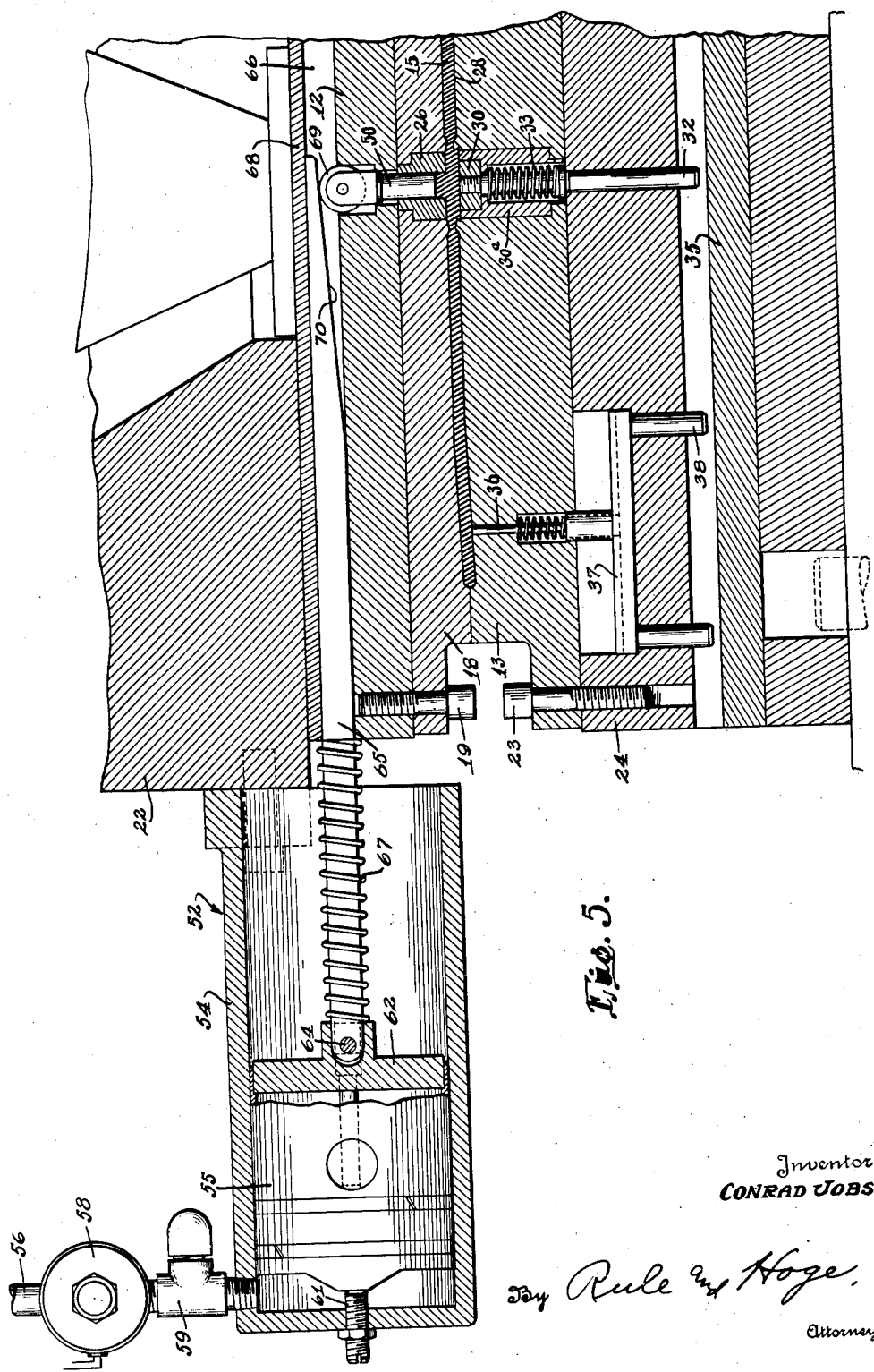
Fig. 5 is a part sectional plan view of the mechanism shown in Fig. 4.

Referring to Fig. 1, the machine comprises a stationary frame 10 on which a mold carriage 11 is mounted for horizontal reciprocation for opening and closing the molds. A multiplicity of cavity molds or molding units is provided. The molds include stationary sections 18 formed with mold cavities 19, said sections being carried on a stationary die plate 12 or platen having a fixed mounting on the machine frame. A movable die plate 13 is mounted on the carriage for horizontal movement therewith to and from a closed position (Fig. 5) in which the mold cavities therein register with those of the stationary sections 18.

The molding compound 15 is forced into the mold cavities by a horizontally reciprocated injection plunger (not shown) driven by an electric motor 16. The molding material is fed through a hopper 17, to the injecting mechanism.

The mold sections 18 are secured at their outer ends to the platen 12 by bolts 19a and at their inner ends by a vertically disposed clamping plate or bar 26 fastened by bolts 26a to the platen. The platen 12 is mounted on an abutment plate 22 forming part of the machine frame. The die plate 13 is secured by bolts 23 (Fig. 5) to a backing plate 24 on the carriage.

The injector 25 (Fig. 4) which extends through an opening in the abutment plate 22, is formed with an annular channel 25a through which the molding material is fed, said channel merging into a passageway leading through the tip 27 of the nozzle. The plate 26 is formed with a sprue hole 20 (Fig. 3) therethrough which registers with the nozzle and provides a passageway from the nozzle to a vertical sprue channel 28 in the plate 26. Branch channels 29 extend from the main channel 28 to the mold cavities 19.

A vertically disposed ejector bar 30 is seated in a correspondingly shaped recess in a vertical bar 30a. The bar 30 has attached thereto, ejector rods 32 which extend through openings in the bar 30a and plate 24. The ejector bar is normally held in a retracted position by coil springs 33 mounted in said openings in the bar 30a and held under compression between said bar and collars 34 secured to the rods 32. The ejector is actuated by a bar 35 mounted on the carriage for limited movement relative to the plate 24. As the carriage is retracted, stops (not shown) arrest the bar 35 so that it operates through the rods 32 to move the stripper bar 30 forwardly for stripping the molded articles from the mold. The stripping action is supplemented by rods 36 (Fig. 5) attached to yokes 37 carrying pins 38 in the path of the bar 35 and thereby operated simultaneously with the ejector rods 32.

When the motor 16 is started as hereinafter described, it operates the injection plunger for conveying molding material forward and forcing it through the nozzle into the molds. When the molds are substantially filled, the back pressure operates through the following mechanism to introduce resistance into the field circuit of the motor and thereby reduce the driving torque. Such mechanism comprises a rod 40 (Fig. 4) mounted in the carriage and extending in the direction of movement with the carriage. The rod extends to the sprue channel 28 and is subjected to the pressure of the molding material. When the molds are substantially filled and the back pressure of the molding material built up to a predetermined degree, the rod 40 is moved rearwardly against the compressive force of a coil spring 41 and thereby operates a lever 42 fulcrumed at 43. The lever actuates a micro-switch 44 (Figs. 2 and 4) thereby introducing an impedence 45 into the field windings of the motor 16. After a predetermined time interval, during which the molding material has set or hardened within the molds, the carriage 11 is withdrawn for separating the dies. This permits a valve 46 (Fig. 4) to close the nozzle 27. The nozzle tip and valve are cooled by the circulation of water, or other cooling fluid through a channel 47.

The parts above described and designated by reference characters are not a part of the present invention except insofar as they cooperate with the novel mechanism, now to be described, for supplementing the injection nozzle and completely filling the molds.

Such mechanism includes a series of horizontal plungers 50 (Figs. 4 and 5) mounted for lengthwise movement in wells 51 extending through the vertical bar 26. The plungers are actuated by fluid operated piston motors 52 and 53. Each motor comprises a cylinder 54 having a stationary mounting on the abutment plate 22, and a piston 55 which reciprocates horizontally in a direction transverse to that of the mold carriage. The piston is moved forwardly by air or other fluid under pressure supplied through a pressure pipe 56. A valve 57 (Figs. 2 and 3) actuated by an electromagnet 58, controls the supply of fluid to the motor cylinders. When the valve piston is in its lowered position (Fig. 2) it connects the pressure pipe 56 with the pipe 59 which communicates with the motor cylinders 54. When the valve piston is lifted the pressure is cut off from the motors and the pipe 59 is connected to an exhaust pipe 60. An adjustable stop-rod 61, threaded in the outer end of the motor cylinder, limits the retraction movement of the piston 55.

Mounted in the forward end of the piston is a disk 62 secured in position by screw bolts 63. A vertical pivot pin 64 extending diametrically across the disk 62 is anchored therein. Rods 65 are attached to the pin 64 and extend forwardly therefrom through the cylinder and into channels 66 formed in the die plate 12. Coil springs 67 are mounted on the rods 65 and held under compression between the disk 62 and the plate 12 and serve to retract the piston. Mounted in the channels 66 and extending lengthwise thereof are stationary bars 68 (Figs. 4 and 5), said bars being T-shaped in cross-section or formed with ribs which extend lengthwise thereof and fit in longitudinal slots in the plate 12. The outer faces of said ribs are preferably flush with the surface of the plate 12 and bear directly against the stationary abutment plate 22. The stationary bars 68 provide a backing for the operating rods 65.

Each of the plungers 50 has journaled thereon a roll 69 which projects into the channel 66 and runs on an inclined surface 70 of the rod 65, said surface being formed by tapering the forward portion of the rod. When a piston 55 is moved forward, the tapered end portions of the attached rods 65 serve as wedges between the rolls 69 and the backing plates 68, thereby forcing the plungers 50 toward the sprue channel. The inner end of each plunger 50 is positioned a short distance back of the sprue channel, thereby providing a reservoir or pocket which is filled with the molding material when the latter is injected into the molds by the injection plunger. When the back pressure is built up, as heretofore described, and operates to introduce an impedence into the motor field circuit, such pressure also operates automatically to open the control valve 57 for the piston motors as hereinafter described so that the motor pistons are driven forward. This causes the rods 65 by their wedging or camming action to force the plungers 50 inwardly and thereby cause a flow of the molding material from the wells into the sprue channels and from the channels into the mold cavities. Additional molding material is thus forced into the molds for completely filling them and compacting the molding material within the mold cavities. When the mold cavities are thus completely filled, the back pressure of the molding material reacting against the plungers 50 prevents further movement of the rods 65 so that the motor pistons are stopped.

Figure 3:
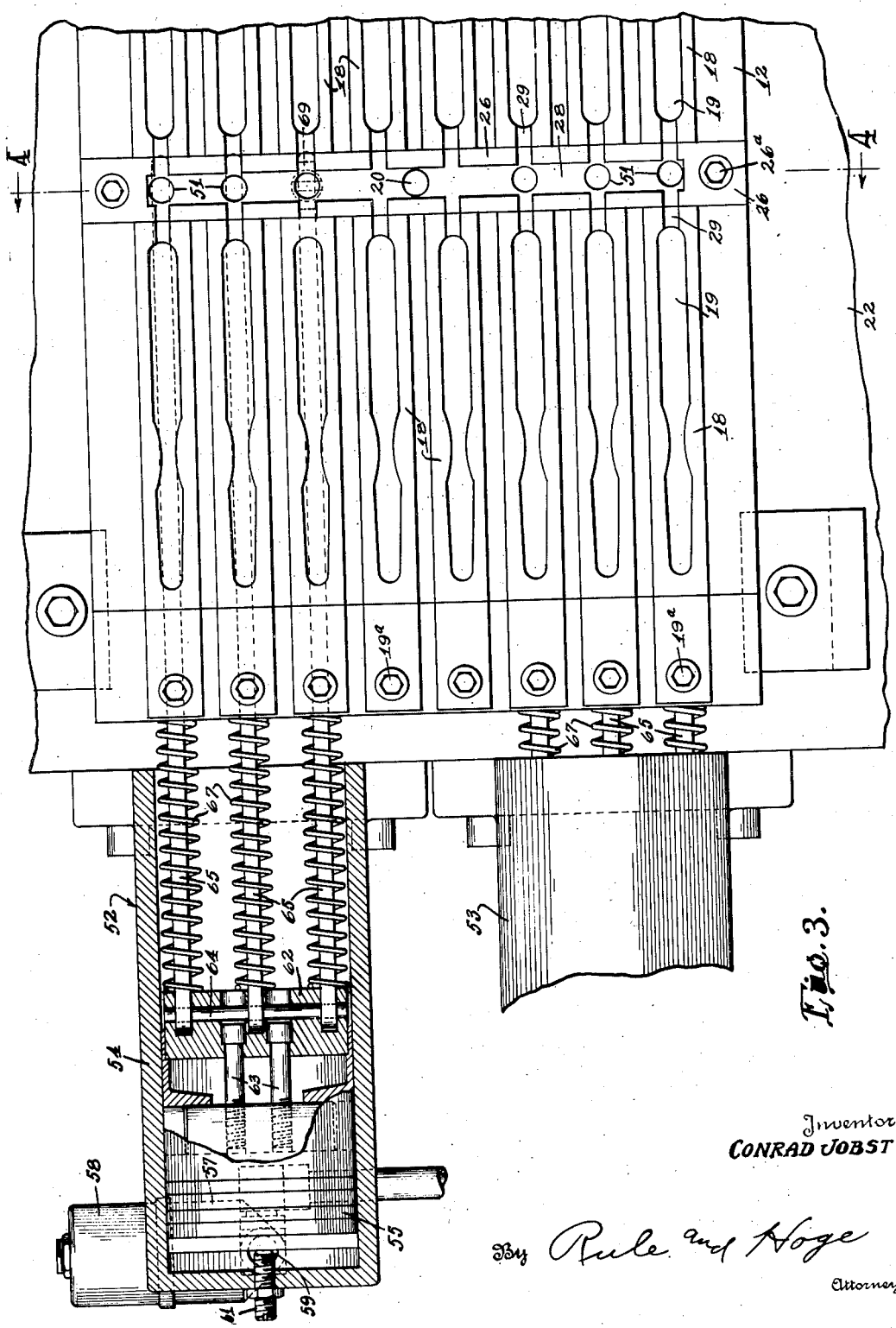
Fig. 3 is a cross-sectional view of the machine on a comparatively large scale, at the line 3—3 on Fig. 1, parts being broken away.
Figure 4:
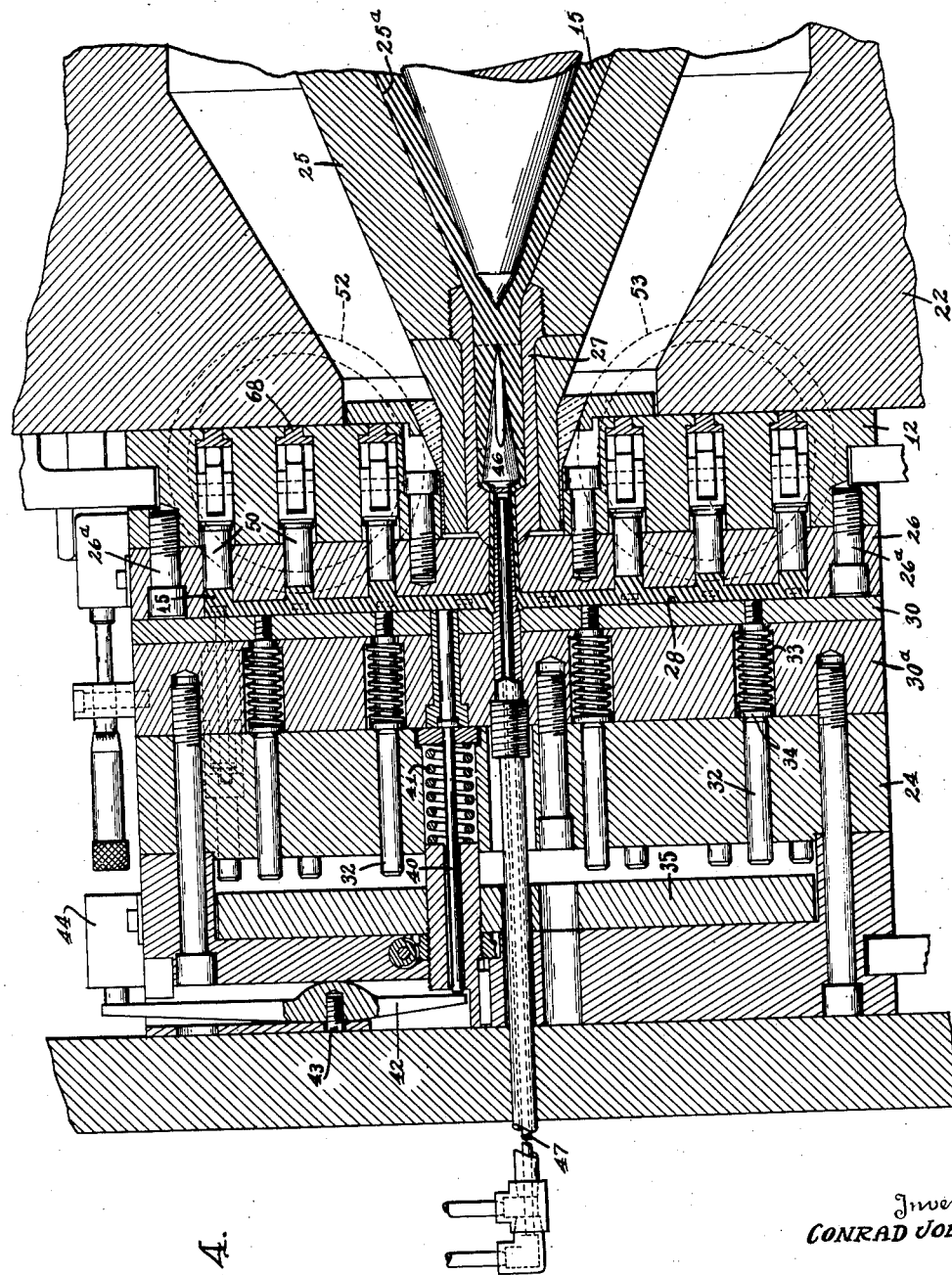
Fig. 4 is a fragmentary sectional elevation at the line 4—4 on Fig. 3, the section being taken longitudinally of the machine at the axis of the injection nozzle.

The rods 65 are arranged all at the same vertical plane. As shown in Fig. 3, they are arranged in groups of three, the piston motors being mounted one above the other and each carrying one of said groups. These groups are arranged to operate the plungers 50, each in a well 51 positioned between the branch channels 29 of a pair of the mold cavities. However, it will be noted that the mold sections nearest the sprue hole 20 (Fig. 3) are not provided with pressure plungers 50 as the flow of molding material is sufficiently direct to insure a complete filling of the more centrally located mold cavities. The plungers are arranged adjacent to and for operation in connection with the mold cavities which are more remote from the injection nozzle and are supplied through longer, more restricted, and more devious passageways which increase the resistance to the flow and also permit a comparatively great degree of cooling and stiffening of the molding material.

The automatic operation and control of the mechanism will now be described.

Figure 2:
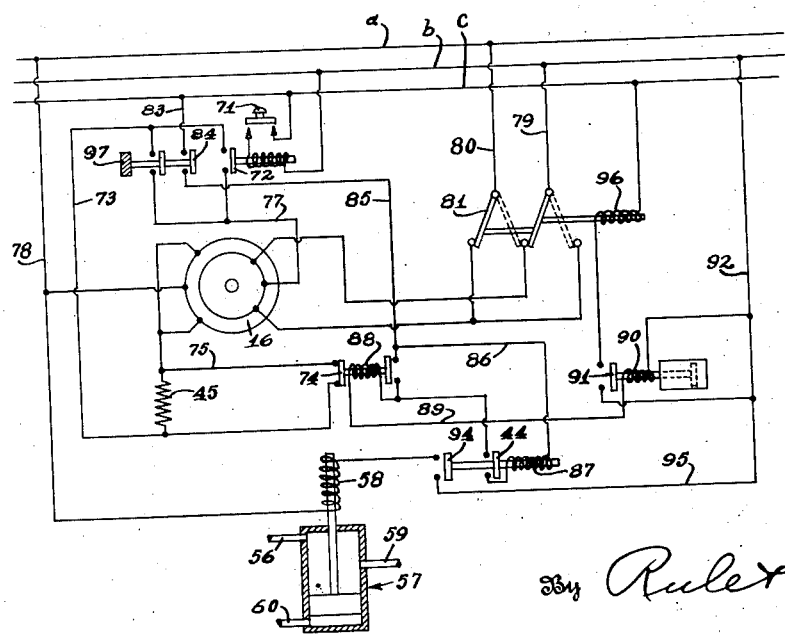
Fig. 2 is a wiring diagram of the electrical controls for the injecting mechanism.

Referring to Fig. 2, the injection motor 16 is operated by electric current in a three-phase system, the current being supplied through mains $a$, $b$, and $c$. Assuming the mold carriage to be in its forward position with the molds closed and the injection plunger retracted, the motor 16 may be started by pressing a push button 71, thereby operating a relay magnet to close the switch 72. This completes a circuit for the field winding of the motor which circuit may be traced from the switch 72, through wire 73, switch 74 and wire 75 to the motor field terminals and from the opposite side of the motor through wire 77 to switch 72. The motor receives current from the mains $a$, $b$, and $c$ to which its terminals are connected respectively by conductors 78, 79, and 80, the conductors 79 and 80 being connected to the motor through a reversing switch 81.

The motor operates the injection plunger to move the molding material forward and then force it through the injection nozzle to fill the molds. When the molds are filled and the back pressure built up as above described, to a predetermined degree, the micro-switch 44 is operated thereby to a closed position. This establishes a circuit which may be traced from the main $c$ through wire 83, contact bar 84 (which at this time is in closed position), wires 85, 86, relay magnet coil 87, switch 44, relay magnet coil 88, wire 89, magnet coil 90 of a time delay switch 91 and wire 92 to main $b$. The relay coil 88, being thus energized, opens its switch 74, thereby introducing the impedance 45 into the motor field and reducing the torque of the motor. The motor, under the reduced torque is stopped by the back pressure of the molding material.

Connected with the switch 44 is a contact bar 94 which is moved to closed position by the closing movement of switch 44. This establishes a circuit for the electromagnet coil 58, which circuit may be traced from main $a$ through conductor 78, coil 58, contact bar 94, and wires 95, 92, to main $b$. The magnet 58, being energized, moves the valve piston to a position to supply pressure to the motor cylinders 55 thereby operating the motor pistons and moving the compressor rods 65 forward for completing the mold filling operation as heretofore described. The molding material is now permitted to set or harden within the molds. The coil 90, energized by the closing of the switch 44 as above noted, operates to close the delay switch 91 after a predetermined time interval, thereby completing a circuit through the coil 96 of the reversing switch 81. The latter is thus operated to reverse the motor 16 and cause it to retract the injection plunger. As the motor 16 about completes the plunger retracting movement, the limit switch 84 is opened by striking a stop 97 thereby opening the motor circuit and the circuits for the various relay magnets and the valve operating magnet 58. Then the motor control valve 57, thus reversed, permits the motor pistons to be reversed, and reset the mechanism. This completes the cycle.

Modifications may be resorted to within the spirit and scope of my invention.

I claim:

1. A molding machine comprising a cavity mold, an injector having a nozzle through which molding material is discharged for filling the mold cavity, a sprue channel extending from the nozzle to the mold cavity, a plunger, a well in which the plunger is mounted to reciprocate, said well opening into the said channel and said plunger forming a wall portion of the well, a fluid operated piston motor, means providing operating connections between the motor and the said plunger for moving the latter toward the sprue channel, a valve controlling the supply of operating fluid to the motor, an electromagnet for actuating the valve, a rod extending substantially to the sprue channel in position to contact with the molding material in the channel and operative directly by a predetermined pressure of the molding material, and means actuated by said rod for effecting the operation of the electromagnet and valve and thereby causing the motor to actuate the said plunger.

2. An injection molding machine comprising die plates having a multiplicity of mold cavities, said plates being movable to and from a closed position, an injector comprising a nozzle, a main sprue channel leading from the nozzle, lateral channels distributed at intervals along said main channel and extending from the main channel to the respective mold cavities, wells positioned at intervals along the main channel and opening thereinto at points remote from the nozzle and adjacent to said lateral channels, plungers mounted for reciprocation in said wells toward and from said main channel, a power motor, means providing operating connections between the motor and the plungers for moving the latter toward the main channel when the motor is actuated, and means operable automatically by a predetermined pressure of the molding material in the channel to effect the operation of said motor.

3. An injection molding machine comprising die plates having a multiplicity of mold cavities, said plates being relatively movable to and from a closed position, an injector comprising a nozzle, a main sprue channel leading from the nozzle, lateral channels positioned at intervals along said main channel and extending from the main channel to the respective mold cavities, wells positioned at intervals along the main channel and opening thereinto at points remote from the nozzle and adjacent to said lateral channels, plungers mounted for reciprocation in said wells toward and from said main channel, a piston motor, wedges individual to the plungers and connected to the motor piston for operation therewith as a unit, and means actuated by said wedges to move the plungers against pressure built up in said wells by the molding material.

4. An injection molding machine comprising die plates having a multiplicity of mold cavities, said plates being relatively movable to and from a closed position, an injector comprising a nozzle, a main sprue channel leading from the nozzle, lateral channels extending from the main channel to the respective mold cavities, wells positioned at intervals along the main channel and opening thereinto at points adjacent to the lateral channels, plungers mounted for reciprocation in said wells toward and from said main channel, backing plates mounted in fixed position behind said plungers, and rods connected to the motor piston and extending along said backing plates, said rods being formed with tapered portions interposed between the plungers and said backing plates and positioned and tapered in a direction to force the plungers forward when said rods are actuated by the motor.

5. The combination of a mold having a cavity therein, a well communicating with the mold cavity, a plunger mounted to reciprocate in the well and thereby vary its capacity, a roll connected to said plunger, a backing plate mounted in fixed position behind the roll, a rod mounted for reciprocation along the backing plate and having a tapered portion between the backing plate and the roll, and means for moving said rod lengthwise and causing said tapered portion to move the plunger in a direction to cause a flow of molding material from the well and into the mold cavity.

6. The combination of a mold having a cavity therein, a well communicating with the mold cavity, a plunger mounted to reciprocate in the well and thereby vary its capacity, a roll connected to said plunger, a backing plate mounted behind the roll, a rod mounted for reciprocation along the backing plate and having a tapered portion forming a wedge between the backing plate and the roll, means for introducing molding material into the mold cavity and said well, a motor connected to said rod, and means operable by back pressure of the molding material to cause operation of said motor and rod in a direction to move the plunger toward the mold cavity and thereby build up pressure on the molding material.

7. The combination of a mold having a cavity therein, a well communicating with the mold cavity, a plunger mounted to reciprocate in the well and thereby vary its capacity, a roll connected to said plunger, a backing plate mounted in fixed position behind the roll, a rod mounted for reciprocation along the backing plate and having a tapered portion forming a wedge between the backing plate and the roll, means for introducing molding material into the mold cavity and said well, a fluid operated piston motor, said rod being connected to the motor piston, a valve controlling the supply of the operating fluid to the motor, and electro-responsive means actuated by a predetermined back pressure of the molding material to operate said valve and thereby cause the motor to move said rod in a direction to move the said plunger forward and build up pressure against the molding material.

8. An injection molding machine comprising die plates having a multiplicity of mold cavities, said plates being relatively movable to and from a closed position, an injector comprising a nozzle, a main sprue channel leading from the nozzle, lateral channels distributed at intervals along said main channel and extending from the main channel to the respective mold cavities, wells positioned at intervals along the main channel and opening thereinto at points remote from the nozzle and adjacent to said lateral channels, plungers mounted for reciprocation in said wells toward and from said main channel, power means operatively connected to the plungers for moving the latter toward the main channel, and means operable automatically by a predetermined pressure of molding material in said main channel for causing the operation of said power means and thereby effecting said movement of the plungers and increasing the pressure on the molding material in the said channels and mold cavities.

CONRAD JOBST.

REFERENCES CITED

The following references are of record in the file of this patent:

UNITED STATES PATENTS

| Number | Name | Date |
|---|---|---|
| 2,151,131 | McWane | Mar. 21, 1939 |
| 2,181,157 | Smith | Nov. 28, 1939 |
| 2,372,833 | Jobst | Apr. 3, 1945 |

FOREIGN PATENTS

| Number | Country | Date |
|---|---|---|
| 541,787 | Great Britain | Dec. 11, 1941 |